United States Patent [19]
Takeya

[11] Patent Number: 5,410,524
[45] Date of Patent: Apr. 25, 1995

[54] RECORDING MEDIUM APPARATUS FOR INHIBITING PLAYBACK OF PREDETERMINED RECORDED PORTIONS

[75] Inventor: Noriyoshi Takeya, Tokorozawa, Japan

[73] Assignee: Pioneer Electronic Corporation, Tokyo, Japan

[21] Appl. No.: 124,609

[22] Filed: Sep. 21, 1993

[30] Foreign Application Priority Data

Sep. 22, 1992 [JP] Japan .................................. 4-252918

[51] Int. Cl.$^6$ .............................................. G11B 17/22
[52] U.S. Cl. ......................................... 369/32; 369/47; 369/54
[58] Field of Search .................... 369/32, 44.28, 44.27, 369/44.11, 54, 48, 47, 33, 41, 43, 50, 59, 267, 30; 360/73.03, 72.01, 77.02, 78.04, 78.05

[56] References Cited

U.S. PATENT DOCUMENTS 4,855,978  8/1989  Kanamaru ............................. 369/32

Primary Examiner—Georgia Y. Epps
Assistant Examiner—Ali Neyzari
Attorney, Agent, or Firm—Cushman, Darby & Cushman

[57] ABSTRACT

In a recording medium playing apparatus, information on the medium (which is not reproduced when the medium is operated in a special playback mode) can not be arbitrarily reproduced when the medium is operated in an ordinary playback mode. A mask-clearing signal is stored in a memory at every unit information of reproduced one of all the information, the one being reproduced during the special playback mode in which the medium is operated when a predetermined data is processed. The apparatus judges whether the mask-clearing signal is stored in the memory at every unit information of the medium when the medium is operated in the ordinary playback mode, and unless the mask-clearing signal is stored, the unit information is inhibited from being output. In the ordinary playback mode, all of the information is not reproduced so as to retain the value and meaning of the game's software and become meaningless.

4 Claims, 8 Drawing Sheets

FIG. 8

| TOC INFOR-MATION | TRACK NUMBER | MASK FLAG |
|---|---|---|
| A | 1 | 1 |
| | 2 | 1 |
| | 3 | 1 |
| | ⋮ | ⋮ |
| | 99 | 1 |
| B | 1 | 0 |
| | 2 | 0 |
| | 3 | 1 |
| | ⋮ | ⋮ |
| | 99 | 1 | though, in some cases, it is often disadvantageous to permit all the recorded image and sound to be arbitrarily reproduced when the video disk is played back. For example, in educational images and game images, some have their progress varied in accordance with the user's instructions. In other words, for example when the solution of an examination or the point of a game are available in an easy manner, softwares of such examination and game lose their value and become meaningless.

RECORDING MEDIUM APPARATUS FOR INHIBITING PLAYBACK OF PREDETERMINED RECORDED PORTIONS

BACKGROUND OF THE INVENTION

Field of the Invention

The present invention relates to a recording medium playing apparatus, such as disk players capable of reproducing audio and video signals of the recording medium in a special playback mode such as game modes, in addition to an ordinary playback mode.

Description of Background Information

Both video disk players and video tape recorders have been well known in the prior art as conventional systems for reproducing the audio and video signals of recording media for many years. For example, in the video disk player, generally speaking, audio and video signals recorded on its disk may be directly reproduced when the disk is properly formatted.

In addition, another video disk called the "LD-ROM" is known on which analog audio/video signals are recorded together with digital signals or data. In the LD-ROM, the digital data is formatted in the same manner as that of the CD (i., compact disk) so as to be EFM-modulated and then recorded.

Consequently, in the recording of the LD-ROM, by inserting a specific code into a channel Q of a subcode, it is possible for a user or player to prevent the audio signals from being reproduced in an area from which the specific code is extracted. However, in the remaining area from which the specific code is not extracted, both the video and the audio signals recorded on the disk as described above are directly reproduced.

On the other hand, in some cases, it is often disadvantageous to permit all the recorded image and sound to be arbitrarily reproduced when the video disk is played back. For example, in educational images and game images, some have their progress varied in accordance with the user's instructions. In other words, for example when the solution of an examination or the point of a game are available in an easy manner, softwares of such examination and game lose their value and become meaningless.

OBJECT AND SUMMARY OF THE INVENTION

It is an object of the present invention to provide a reproducing system of a recording medium, in which system: information recorded on the recording medium (which is not reproduced when the recording medium is operated in a special playback mode) can not be arbitrarily reproduced when the recording medium is operated in an ordinary playback mode.

In accordance with the present invention, there is provided a reproducing system of a recording medium, provided with, in addition to an ordinary playback mode, a special playback mode in which the recording medium is operated when a predetermined data is processed in accordance with an input operation, comprising: selecting means for selecting the ordinary playback mode or the special playback mode; memory means for storing a mask-clearing signal at every unit information of reproduced ones of all information recorded on the recording medium, the one being reproduced when the recording medium is instructed to be operated in the special playback mode; judging means for judging whether or not the mask-clearing signal is stored in the memory means at every unit information of the recording medium when the recording medium is operated in the ordinary playback mode; and inhibiting means for inhibiting reproduced unit information from being output, with which unit information the mask-clearing signal is not stored.

In the reproducing system of the present invention, since the predetermined data is processed during the special playback mode, the mask-clearing signal is stored in the memory means at every unit information of reproduced ones of all information recorded on the recording medium. It is judged whether the mask-clearing signal is stored in the memory means at every unit information of the recording medium when the recording medium is operated in the ordinary playback mode, the unit information with which the mask-clearing signal is stored is reproduced and output, and the unit information with which the mask-clearing signal is not stored is inhibited from being output.

BRIEF DESCRIPTION OF THE DRAWINGS

FIG. 8 is diagram showing a mask-flag table.

DESCRIPTION OF THE PREFERRED EMBODIMENTS

Hereinbelow, embodiments of the present invention will be described in detail with reference to the drawings.

Figure 1:
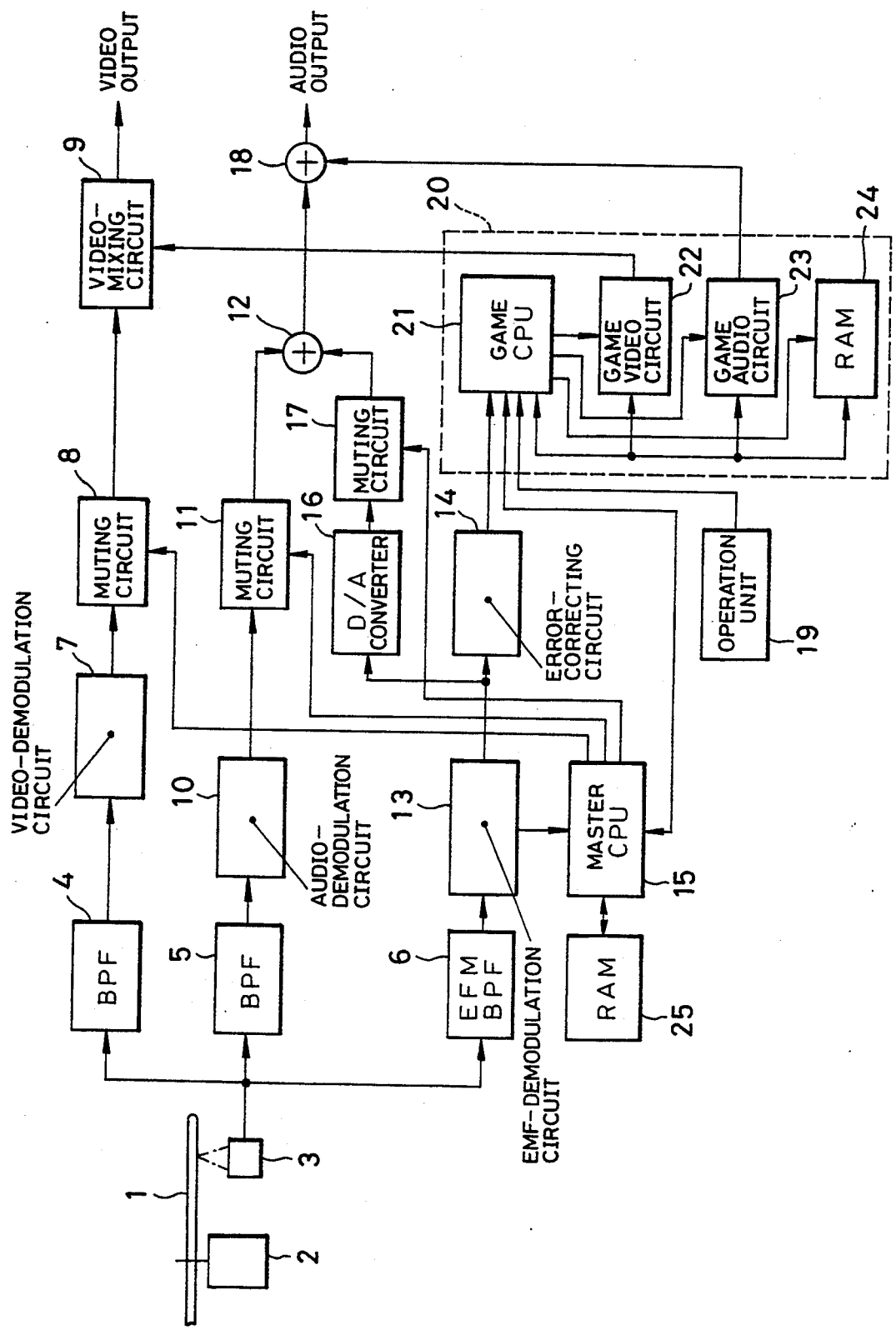
FIG. 1 is a block diagram of an embodiment of the present invention.

FIG. 1 shows a video disk player which may be used as a video game system to which the present invention is applied. This video disk player uses, as its disk, an LD-ROM which has signals (i.e., all of analog video signals, 2-channel analog audio signals and digital data signals) frequency-multiplexed in their recording on the LD-ROM. The analog video signals show a background image of a game, while the 2-channel analog audio signals show different narrations and background sound of the same game. The digital data signals show PCM audio data, game programs, and graphic image data such as characters and letters. The analog audio and video signals are FM signals having been frequency-modulated, while the digital data signals are EFM (i.e., Eight to Fourteen Modulation) signals having been EFM-modulated. As shown in FIG. 1, information recorded on a disk 1 is picked up by a pick-up device 3 while the disk 1 is rotatably driven by a spindle motor 2. As a result, the pick-up device 3 issues RF (high frequency) signals to each of a video signal band-pass filter (BPF) 4, an analog audio signal band-pass filter (BPF) 5 and an EFM data signal band-pass filter 6.

A pass band of the video signal band-pass filter 4 is set so as to correspond to a frequency band (for example, from 3.5 to 15 MHz) occupied by a carrier channel of the FM video signal. The FM video signal having passed through the band-pass filter 4 is supplied to a video-demodulation circuit 7 in which the FM signal is demodulated into a video signal which is then output through a muting circuit 8 and a video-mixing circuit 9.

The signal having passed through the band-pass filter 5 has its audio carrier-wave components exclusively separated as to be two channel FM audio signals, the audio carrier-wave components being 2.3 MHz and 2.8 MHz (for example). Each of the thus separated FM audio signals are demodulated in an FM demodulation circuit 10 to become two channel audio outputs. In the drawings, only one channel is shown. An output terminal of the FM demodulation circuit 10 is connected with a mixer 12 through a muting circuit 11.

On the other hand, for example, by the use of the digital EFM signal band-pass filter 6 which allows frequency components lower than, e.g., 2 MHz to pass therethrough, an EFM signal is separated from the reproduced RF signal. The thus separated EFM signal is then demodulated in an EFM demodulation circuit 13 to become a data output. Such data output is supplied to an error-correcting circuit 14 and a D/A converter 16. The error-correcting circuit 14 is provided with a ROM (not shown) in which error-correction information is stored. Consequently, in accordance with such error-correction information, the error-correcting circuit 14 corrects errors appearing in the data supplied from the EFM demodulation circuit 13. The D/A converter 16 converts the PCM audio data into an analog audio signal. An output terminal of the D/A converter is connected with the mixer 12 through a muting circuit 17. On the other hand, an output terminal of the mixer 12 is connected with another mixer 18.

Figure 2:
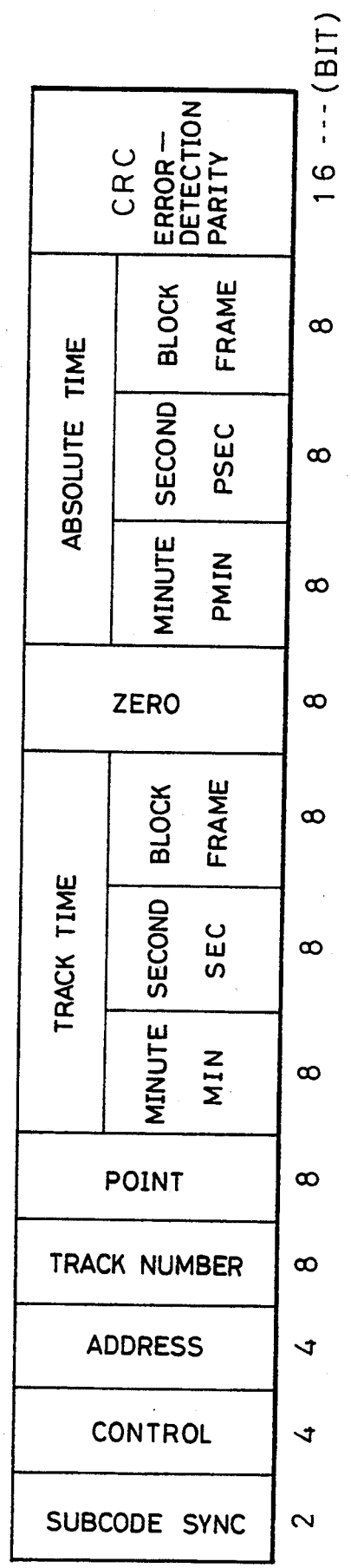
FIG. 2 is a view illustrating a format of a Q signal of a subcode.

Also recorded on the LD-ROM (which serves as the disk 1) is identification information which shows that the LD-ROM contains the digital EFM signal. In the LD-ROM, TOC (Table Of Contents) information, which is recorded as subcode Q in a lead-in area, contains such identification information which the subcode Q contains in a program area too. A format of the subcode Q forming the TOC information starts from subcode synchronizing portions S0, S1 (shown in FIG. 2) in one subcode frame (98 frames) for example such as the lead-in area, and is constructed of: a control portion; an address portion; a track number; a point portion; a track time consisting of MIN, SEC and FRAME; an absolute time consisting of PMIN, PSEC and PFRAME; and, an error-detecting portion CRC. When the control portion constructed of 4 bits is "0101" or "0110", the presence of the LD-ROM is detected. Such subcode Q signal of the TOC information and the like is separated in the EFM demodulation circuit 13 and then supplied to a master CPU 15. In operation, the CPU 15 controls the disk player together with its servo system in accordance with various commands issued from another CPU 21 which will be described later.

An output terminal of the error-correcting circuit 14 is connected with a game block 20. Provided in the game block 20 are: a game CPU 21 containing a ROM (not shown) therein, the ROM previously storing therein a base program required to perform a game program; a game video circuit 22; a game audio circuit 23; and a RAM 24. The CPU 21 receives data which has been corrected in the error-correcting circuit 14 and issued therefrom to the CPU 21. In accordance with the game program stored in its internal ROM and operations input through an operation unit 19, the CPU 21 controls the game video circuit 22, the game audio circuit 23 and the RAM 24, and supplies necessary data thereto. Naturally, the CPU 21, the game video circuit 22, the game audio circuit 23 and the RAM 24 are connected with each other through a common data bus. Furthermore, a control signal line extending from the CPU 21 is also connected with each of the game video circuit 22, the game audio circuit 23 and the RAM 24.

In addition, the CPU 21 exchanges commands and data with the CPU 15. The game video circuit 22 receives the graphic video data (which is issued from the CPU 21), converts the same into an analog graphic video signal according to a control signal issued from the CPU 21, and supplies such analog graphic video signal to the video mixing circuit 9. The mixing circuit 9 performs a superimposing function in mixing the video signal (which is issued from the muting circuit 8) with the graphic video signal. The thus mixed or resultant video signal is supplied to a CRT display (not shown). Supplied to the game audio circuit 23 is an audio data issued from the CPU 21. The game audio circuit 23 converts the thus supplied audio data into an analog audio signal according to a control signal (which is issued from the CPU 21), and supplies the same to the mixer 18. In the mixer 18, each of the thus supplied audio signals is simply added to each other so that the mixer 18 functions to mix these signals.

Connected with the CPU 21 is the operation unit 19 which is provided with a plurality of keys such as a start key, a cursor key, a mode-selection key and the like to control the game.

Now, the system of the present invention having the above construction will be described in operation thereof.

Figure 3:
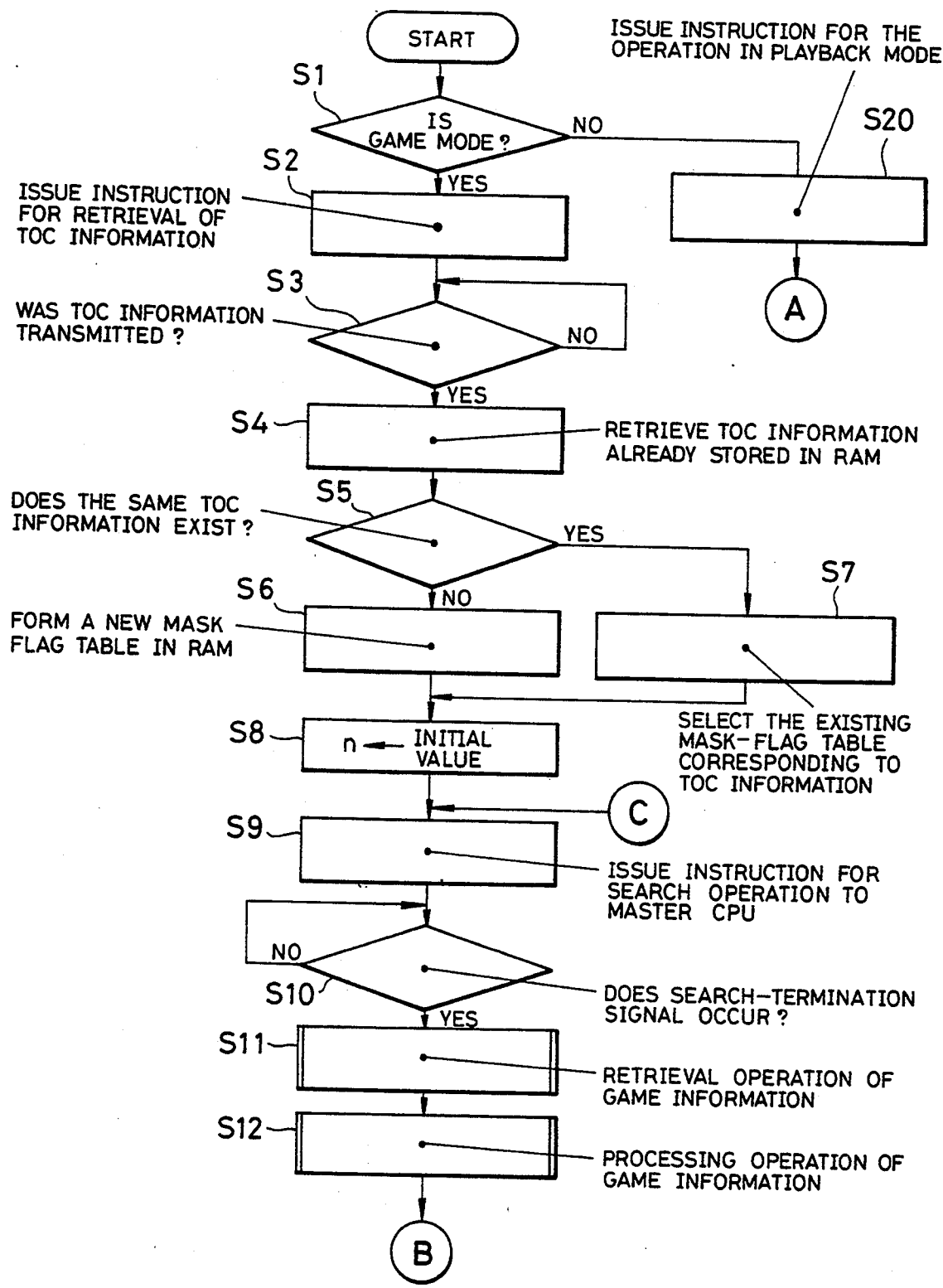
FIG. 3 is a flowchart of the operation of a game CPU.
Figure 4:
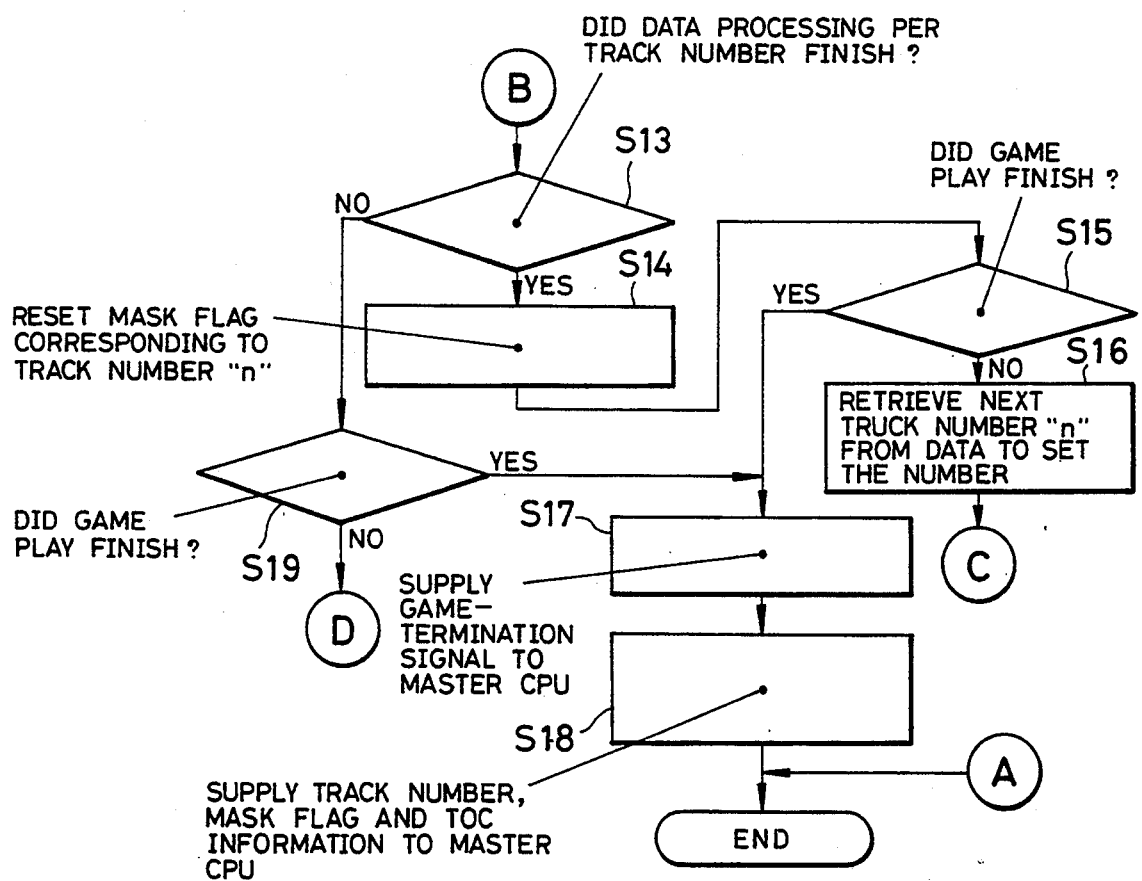
FIG. 4 is a continued part of the flowchart of FIG. 3, illustrating operations of the game CPU shown in FIG. 3.

As shown in FIG. 3, when the start key is depressed, it is judged by the CPU 21 in a step S1 whether or not the current mode is the game mode. Since it is possible for the user or player to take either the ordinary playback mode (i.e., play mode) or the game mode (which serves as the special playback mode) as an option, it is possible to judge whether the current mode is the game mode or not on the basis of the current condition of the mode-selection key. When it is found that the current mode is the game mode, in a step S2, an instruction for retrieving the TOC information in the game mode is issued to the CPU 15 in order to have the game started.

Figure 5:
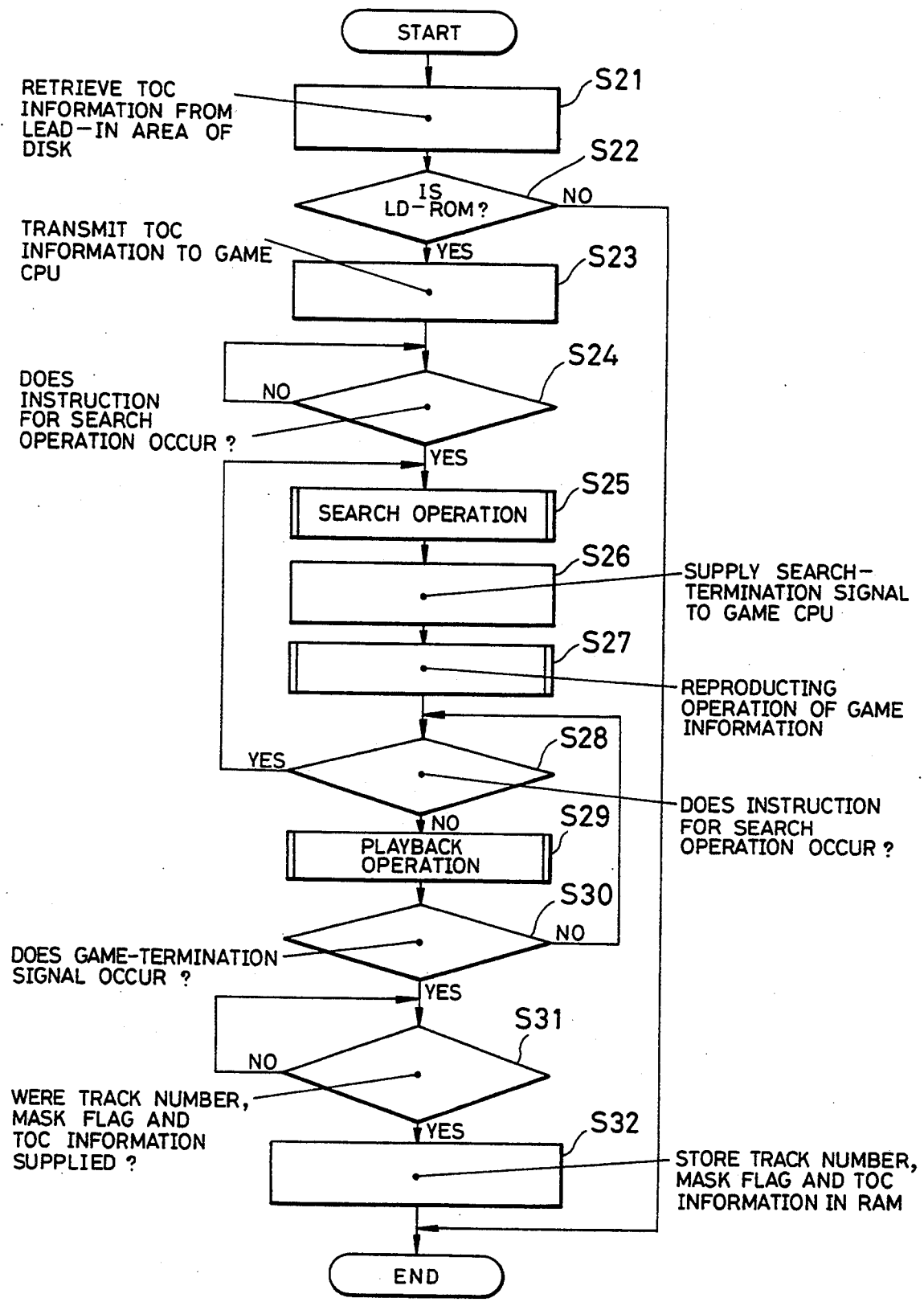
FIG. 5 is a flowchart of the operation of a master CPU.

In accordance with the instruction for retrieving the TOC information, as shown in FIG. 5, first of all, in a step S21, the CPU 15 retrieves the TOC information from the lead-in area of the disk 1 to judge whether or not the disk 1 is the LD-ROM on the basis of the thus retrieved TOC information in a subsequent step S22. Namely, when a 4-bit control portion of the TOC information is represented by a bit-array or code "0101" or "0110" (for example), it is possible to judge that the disk 1 is the LD-ROM. Otherwise, or when the 4-bit control portion is not represented by the above code, it is judged that the disk 1 is not the LD-ROM. In case the disk 1 is the LD-ROM, the thus retrieved TOC information is transmitted to the CPU 21 of the game block 20 in a subsequent step S23.

On the other hand, in the CPU 21, it is judged whether or not the TOC information is transmitted from the CPU 15 in a step S3 shown in FIG. 3. When it is found that the TOC information is transmitted, the RAM 24 retrieves the TOC information (which has already been stored) in a subsequent step S4, and judges whether or not there is the same TOC information as that of one having been transmitted in the thus retrieved TOC information in a subsequent step S5. When there is not the same TOC information in the retrieved TOC information, such retrieved TOC information is stored in the RAM 24 to form a new mask-flag table in a subsequent step S6 followed by a step S8 which will be described later. When there is already the same TOC information in the retrieved TOC information, as shown in FIG. 8, since a mask-flag table corresponding to such TOC information is already formed in the RAM 24, such mask-flag table is selected in a step S7 following the step S5. The condition of the mask-flag table is represented by "1" in its initial stage to show a condition in which a mask flag is set at any track number as is in TOC information "A" shown in FIG. 8. The tack number herein referred to does not mean an actual guide groove or track of the disk, but means an order number of musical programs contained in the CD (i.e., compact disk).

After completion of processes in the steps S6 and S7, the CPU 21 sets the track number "n" at an initial value in a step 8 (which follows these steps S6 and S7), and issues in a subsequent step S9 an instruction to the CPU 15 to have the same perform a search operation for a top address of the track number in which the data to be retrieved is recorded. It is not necessarily required to keep the initial value of the track number "n" constant. For example, it is also possible to set such initial vale in accordance with a starting instruction of the game input by the operation unit 19. After issuance of the instruction of the search operation, in a step S10 following the step S9, it is judged whether or not a search-termination signal is issued.

After execution of the step S23, the CPU 15 judges in a step S24 whether or not the instruction of the search operation is issued. When it is found that such instruction is issued, the search operation is conducted in a step S25 following the step S24. After completion of the search operation for the top address of the track number "n", the search-termination signal is issued to the CPU 21 in a step S26 following the step S25.

When the CPU 21 judges in the step S10 that the search-termination signal is issued, the CPU 21 retrieves the game information in a step S11 following the step S10. In the retrieving operation of the game information, first of all, the CPU 21 issues a game-information retrieving instruction to the CPU 15. Consequently, in a step S27 following the step S26, the CPU 15 has the pick-up device 3 pick up the game information from the disk 1 in accordance with a reproducing instruction. The thus picked-up game information is then transmitted to the CPU 21 through the EFM demodulation circuit 13 and the error-correcting circuit 14. Upon reception of such game information issued from the CPU 15, the CPU 21 stores the game information in the RAM 24. After completion of the retrieving operation of the game information, the CPU 21 processes the game information in a step S12 following the step S11. In processing the game information, the CPU 15 judges in a step S28 following the step S27 whether or not the instruction of the search operation is issued from the CPU 21. When it is found that the CPU 21 issues such instruction, the search operation is conducted in a step S25 following the step S28. In addition, in a step S29 following the step S28, the CPU 15 performs, during the processing operation of game information, a playback operation in accordance with a playback instruction issued from the CPU 21.

In such playback operation, the CPU 21 shows a retrieval position of the disk 1 to the CPU 15, so that the CPU 15 retrieves information at the thus shown retrieval position. The video signal components in the RF signals picked up by the pick-up device 3 is supplied to the video-demodulation circuit 7 through the band-pass filter 4, and demodulated into the video signals in the circuit 7. On the other hand, the audio signal components in such picked-up RF signal pass through the band-pass filter 5 to reach the audio-demodulation circuit 10 in which the audio signal components are converted into the analog audio signals. As for data signal components in the picked-up RF signals, such components are supplied to the EFM-demodulation circuit 13 through the filter 6, and are demodulated into the data. This data is then issued from the circuit 13 to the error-correcting circuit 14 in which the data is corrected. The thus corrected data is then supplied to the CPU 21.

The CPU 21 processes the corrected data through the game information processing in accordance with the game program and the instructions input through the operation unit 19 to produce the graphic video data which is supplied to the game video circuit 22, while the audio data is supplied to the game audio circuit 23. In the game video circuit 22, the video data is converted into the analog graphic signal. Although the video mixing circuit 9 generally issues the analog video signal which has been issued from the video-demodulation circuit 7 through the muting circuit 8, when the graphic video signal is issued from the game video circuit 22, the video mixing circuit 9 issues the latter graphic video signal with first priority, or the game CPU 21 controls the video-mixing circuit 9 to have the analog video signal and the graphic video signal mixed with each other therein at a mixing ratio specified by the game program, so that the thus mixed video output is issued from the video-mixing circuit 9. In the game audio circuit 23, the audio data is converted into the analog audio signal.

The analog audio signal issued from the audio-demodulation circuit 10 is supplied to the mixer 18 through the muting circuit 11 and the mixer 12. The mixer 18 directly issues the analog audio signal issued from the mixer 12. When the game audio circuit 23 issues the audio signal, such audio signal is mixed with the analog audio signal issued from the mixer 12, and issued from the mixer 18 as the audio output. On the other hand, when the digital audio data is issued from the EFM-demodulation circuit 13, such digital audio data is converted in the D/A converter 16 into the analog audio data which is then supplied to the mixer 18 through the muting circuit 17 and the mixer 12. In accordance with instructions issued from the CPU 21, the CPU 15 controls each of the muting circuits 8, 11, 17 to have the same either turned on or turned off with respect to the signal.

After execution of the step S12, in a step S13, the CPU 21 judges whether or not a data processing per track number of the disk finishes. For example, this is judged from the fact that the data processing reaches its final step. After completion of such data processing per track number, in a step S14 following the step S13, a mask flag corresponding to the track number "n" is reset with the use of the mask flag table defined in the step S6 or the step S7. As a result, in the mask flag table, for example, as is in the track numbers 1 and 2 of TOC information B shown in FIG. 8, the mask flag is reset, and, therefore has its current condition represented by "0" which defines a mask-clearing signal.

In the step S13, when the data processing per track number is not completed, the process goes to a step S19 in which it is judges whether or not the game play is finished. When the game play is still not finished, the process returns to the step S11 to continue the data processing. When the game play is finished, the process goes to the step S17. On the other hand, after completion of the execution of the step S14, the process goes to the step S15 in which it is judged whether or not the game play is finished. The finish of the game play may be judged from the end of data processing or a stop instruction input through the user's operation unit 19. When the game play is still not finished, the process goes to a step S16 in which the next track number "n" is retrieved from the Q data to set the same. The step S16 is followed by the step S9. When the game play is finished, the process goes to the step S17 in which the game-termination signal is supplied to the CPU 15. Thereafter, the process goes to the step S18 in which the track number, mask flag and the TOC information all stored in the RAM 24 are supplied to the CPU 15 so that the process passes through the current routine.

After execution of the step S29, the process goes to the step S30 in which the CPU 15 judges whether or not the game-termination signal is issued. When the game-termination signal is issued from the CPU 21, the process goes to the step S31 in which it is further judged whether or not the step S18 is executed to supply the track number, mask flag and the TOC information to the master CPU 15. When the track number, mask flag and the TOC information are supplied, these data (i.e., the track number, mask flag and the TOC information) are stored in a RAM 25 in the step S32. In the RAM 25, the same mask flag table as that formed in the RAM 24 is formed. However, in this case, as will be described later, since the TOC information is used as information inherent in the disk to identify the disk, it is not necessary to store the entire TOC information. Namely, for example, of the TOC information: the only stored data may be the total time of the disk, the number of musical programs, the playing time of the first musical program, and a value derived from an arithmetic combination of these data.

On the other hand, when it is judged to be an ordinary playback mode not to be the game mode in the step S1, the process goes to the step S20 in which the CPU 21 issues an instruction to the CPU 15 to start the ordinary playback operation conducted in the ordinary playback mode.

Figure 6:
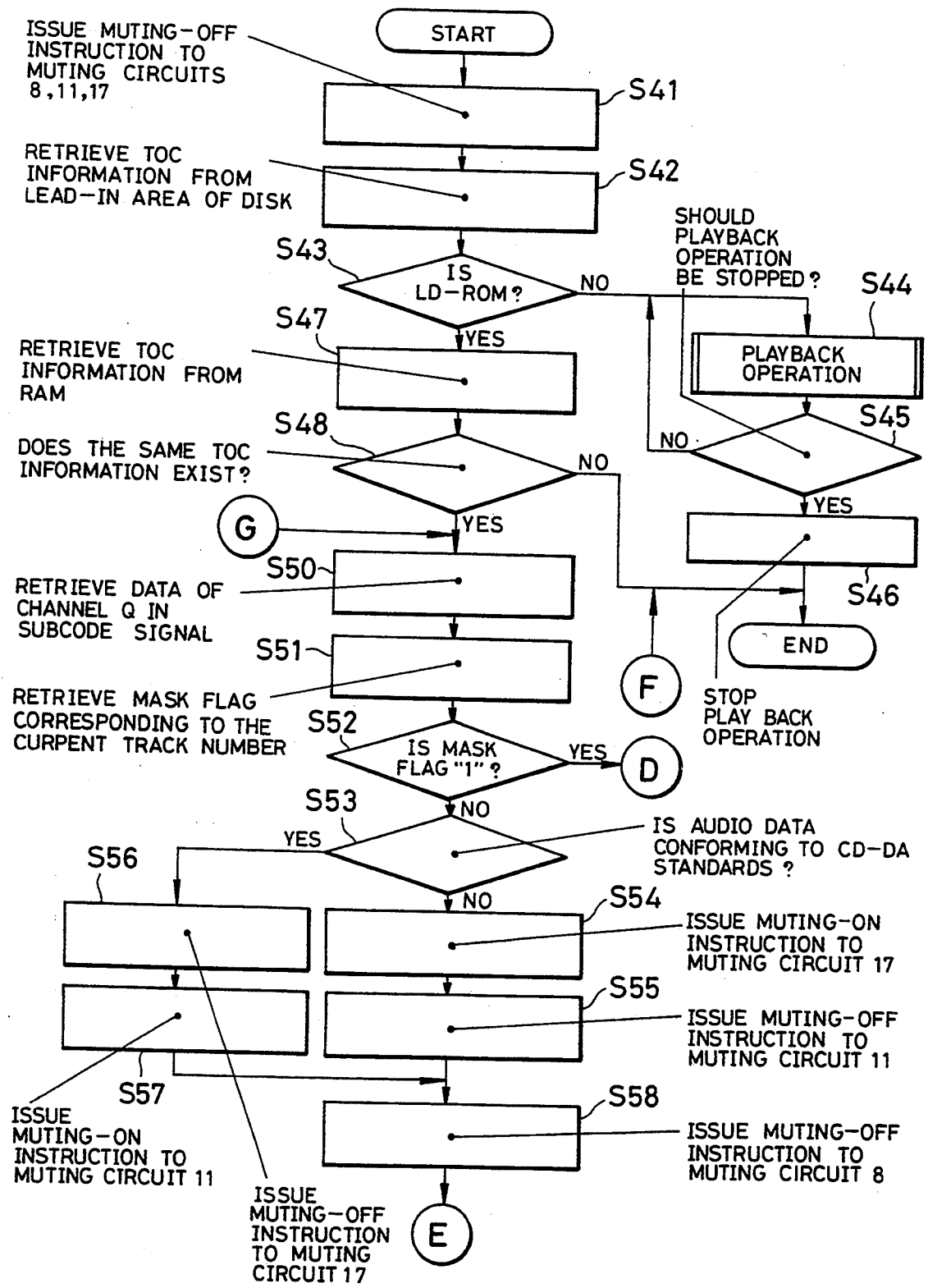
FIG. 6 is a flowchart of the operation of the master CPU.
Figure 7:
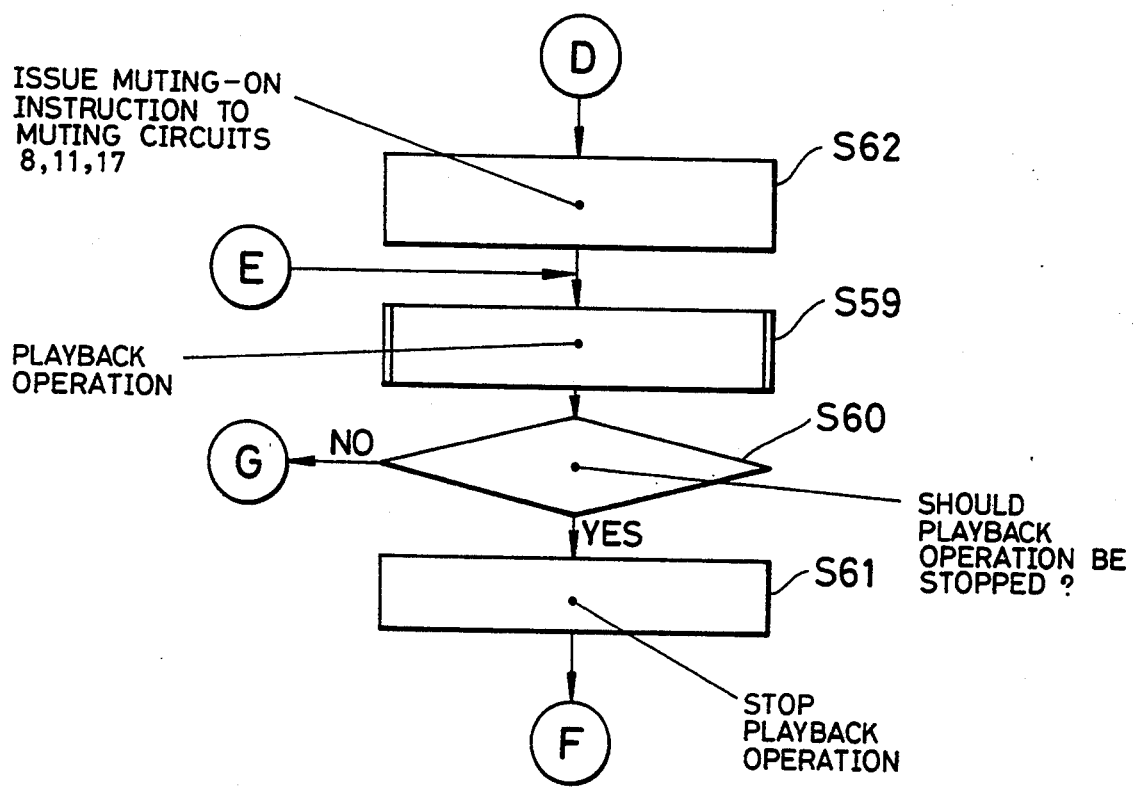
FIG. 7 is a flowchart illustrating a continued part of the operation of the master CPU shown in FIG. 6.

As shown in FIGS. 6 and 7, in accordance with a playback instruction, the CPU 15 issues first a muting-off instruction to the muting circuits 8, 11, 17 in a step S41, to have these muting circuits 8, 11, 17 turned off with respect to the signal. After completion of the step S41, the process goes to a step S42 in which the TOC information is retrieved from the lead-in area of the disk 1. The step S42 is followed by a step S43 in which the disk 1 is judged, in the same manner as that described in the step S22, whether it is an LD-ROM or not. When the disk 1 is not the LD-ROM, the process goes to a step S44 in which: since the disk 1 is judged to be the LD or the CD, the playback starts based on the thus retrieved TOC information. The step S44 is followed by a step S45 in which it is judged: whether or not an instruction for stopping the playback operation is issued; and, whether or not the current position of the playback operation reaches the lead-out area of the disk 1. When the user operates a predetermined key of the operation unit 19 to issue therefrom the instruction for stopping the playback operation to the CPU 21 and then to the CPU 15, or when the current position of the playback operation reaches the lead-out area of the disk 1 to have the playback operation cease, the process goes to a step S46 in which such playback operation is positively stopped, whereby the current routine is passed through.

When the disk 1 is the LD-ROM, the process goes to a step S47 in which the TOC information having been already stored in the RAM 25 as the disk's inherent information is retrieved. The step S47 is followed by a step S48 in which it is judged whether or not the same TOC information as that retrieved from the disk 1 is found in the thus retrieved TOC information. When the same TOC information is not found, this is the first time that the disk 1 or LD-ROM is played back. Since it is necessary to keep the recorded contents of the LD-ROM secret when the LD-ROM is played back in the ordinary playback mode other than the game mode, the current routine is passed through. When the same TOC information is found in the step S48, the process goes to a step S50 in which a data area (which is to be played back) of the disk 1 is partially played back to obtain the channel Q's data in the subcode signal. Namely, a track number TNO in the channel Q's data is retrieved as the current track number.

The step S50 is followed by a step S51 in which: retrieved is a mask flag corresponding to the current track number having been retrieved from the mask flag table which corresponds to the TOC information of the RAM 25. In a step S52 following the step S51, the thus retrieved mask flag is judged whether or not it is "1" which represents a set condition. When the mask flag is "0" which represents a reset condition, this means that the data of the current tack number has been already processed in the game mode. In this case, the process goes to a step S53 in which: in accordance with a control portion in the channel Q's data obtained in the step S50, it is judged whether or not the recorded information of the current track number is a digital audio data which meets CD-DA (which is a compact disk adapted exclusively for a general audio use according to the provisions of the red book). When the control portion of the Q's data is represented by a cord "0101", the recorded information of the current track number is judged to be a digital audio data. Otherwise, i.e., when the control portion of the Q's data is represented by a cord other than the above cord "0101", the recorded information of the current track number is judged not to be the digital audio data of the CD-DA standards. When the recorded information of the current track number is not the digital audio data of the CD-DA standards, the process goes to a step S54 in which a muting-on instruction is issued to the muting circuit 17, and then a muting-off instruction is issued to the muting circuit 11 in a step S55 following the step S54. In this case, it is possible for the user or player to select either the digital audio data of the CD-DA standards or an analog FM audio data by operating the operation unit 19.

On the other hand, when the recorded information of the current track number is the digital audio data of the CD-DA standards, the process goes to a step S56 in which the muting-off instruction is issued to the muting circuit 17. Thereafter, the muting-on instruction is issued to the muting circuit 11 in a step S57 following the step S56. After execution of the step S55 or the step S57, the process goes to a step S58 in which the muting-off instruction is issued to the muting circuit 8. thereafter, the process goes to a step S59 in which a playback operation is started based on the TOC information, and then the process goes to a step S60 in which it is judged: whether an instruction for terminating the playback operation is issued; or, whether the current position of the playback operation reaches the lead-out area of the disk 1. When the instruction for terminating the playback operation is input by the user or player through the operation unit 19 and supplied to the CPU 15 through the CPU 21, or when the current position of the playback operation reaches the lead-out area of the disk 1 to finish the operation, the process goes to a step S61 in which the playback operation is stopped. When the instruction for terminating the playback operation is not input, or when the current position of the playback operation does not reach the lead-out area of the disk 1, the process goes to the step S50 and repeats the above procedures.

When the mask flag is judged in the step S52 to be "1" representing the set condition, since this means that the data of the current track number is still not processed in the game mode, the muting-on instruction is issued to each of the muting circuits 8, 11, 17 in a step S62 following the step S52. Then, the process goes to the step S59.

In the system of the present invention, when the disk 1 is found to be the LD-ROM and played back by the user for the first time, since the same TOC information is still not stored, the disk 1 can not be played back.

Further, when the disk 1 is found to be the LD-ROM and has already been used in the game mode during the game play, since the same TOC information has been stored in the RAM 25, it is possible to retrieve the mask flag corresponding to the current track number and to confirm its contents. When the mask flag is judged to be "0" representing the reset condition, since the data of the current track number has already been processed in the game mode, the muting circuits 8 and 11 or those 8 and 17 permit the signals (which are supplied thereto depending on the muting-off instructions) to pass therethrough. As a result, both the video signal and the audio signal are output through the playback operation. On the other hand, when the mask flag is judged to be "1" representing the set condition, since the data of the current track number is still not processed in the game mode, each of the muting circuits 8, 11, 17 is turned off with respect to the signals supplied thereto depending on the muting-on instruction. As a result, both the video signal and the audio signal are not output.

When the disk 1 is not the LD-ROM, both the video signal and the audio signal are output during the playback operation. In this condition, the muting circuit 8 is turned on to permit the signal to pass therethrough, while one of the muting circuit 11 and the muting circuit 17 is turned off and the remaining one is turned on with respect to the signal.

Incidentally, in the above-described embodiment of the present invention, though the disk is described as the recording medium, it is also possible to use any other suitable means as the recording medium, for example such as tapes and the like.

Further, in the embodiment, although information per track number is used as unit information, it is also possible to use a predetermined block unit of information as the unit information, for example such as the use of an index number for subdividing the track number and the use of unit time. In addition, it is also possible to realize the use of chapter number and the use of frame number in the video disk. It is also possible to realize a playback operation conduced in the ordinary playback mode on the basis of mask information and the disk's inherent information (i.e., TOC information) stored in the RAM 24.

As described above, according to the present invention: during the special-playback mode operation such as the game mode operation and the like, the mask-clearing signal is stored in the memory means at every unit information which is reproduced one of information recorded on the recording medium through a predetermined data processing; during the ordinary playback operation, it is judged whether or not the mask-clearing signal is stored in the memory means at every unit information of the recording medium; and, unless the mask-clearing signal is stored, the reproduced information is inhibited from being output with respect to the unit information. Consequently, for example, with respect to the game video and audio signals, since the game proceeds depending on the player's operation (i.e., the game video and audio signals are not reproduced and output during the ordinary playback mode operation), there is no fear that the point of the game is easily clarified by the player, and, therefore there is no fear that the game's software loses its value and become meaningless from the point of view of the player.

What is claimed is:

1. A recording medium playing apparatus capable of, in addition to an ordinary playback mode, a special playback mode in which a playback of said recording medium proceeds in accordance with processing of predetermined data read from said recording medium and input operations, comprising:
   selecting means for selecting said ordinary playback mode or said special playback mode;
   memory means for storing a mask-clearing signal for each of a plurality of units of information recorded on said recording medium, said mask-clearing signal representing that a corresponding one of said plurality of units of information is to be reproduced by said recording medium playing apparatus when operating in said special playback mode;
   judging means for judging whether or not said mask-clearing signal is stored in said memory means for each of said plurality of units of information when said recording medium is operating in said ordinary playback mode; and
   inhibiting means for inhibiting an output of said corresponding one of said plurality of units of information from said recording medium playing apparatus when said judging means judges that said mask-clearing signal corresponding to said corresponding one of said plurality of units of information is not stored in said memory means.

2. An apparatus as claimed in claim 1, wherein said memory means stores said mask-clearing signal by resetting a mask flag corresponding to each of a plurality of track numbers contained in TOC information read-out from said recording medium, in accordance with a result of said processing of said predetermined data when said recording medium playing apparatus is in said special playback mode.

3. A recording medium playing apparatus capable of, in addition to an ordinary playback mode, a special playback mode in which a playback of said recording medium proceeds in accordance with processing of predetermined data read from said recording medium and input operations, comprising:
- a processor;
- a mode-selection key connected to said processor to select one of said ordinary playback mode or said special playback mode;
- a memory connected to said processor to store a mask-clearing signal for each of a plurality of units of information recorded on said recording medium, said mask-clearing signal representing that a corresponding one of said plurality of units of information is to be reproduced by said recording medium playing apparatus when operating in said special playback mode, said processor determining whether or not said mask-clearing signal is stored in said memory for each of said plurality of units of information; and
- a mask-flag table in said memory including information corresponding to an output condition of said corresponding ones of said plurality of units of information from said recording medium playing apparatus, said mask-flag table information inhibiting said output of said corresponding one of said plurality of unit of information when said mask-clearing signal corresponding to said corresponding one of said plurality of units of information is stored in said memory at a first level, and allowing said output of said corresponding one of said plurality of unit of information when said mask-clearing signal corresponding to said corresponding one of said plurality of units of information is stored in said memory at a second level.

4. An apparatus as claimed in claim 1, wherein said memory stores said mask-clearing signal by resetting a mask flag in said mask-flag table corresponding to each of a plurality of track numbers contained in TOC information read-out from said recording medium, in accordance with a result of said processing of said predetermined data when said recording medium playing apparatus is in said special playback mode.

* * * * *